United States Patent
Jiang et al.

(10) Patent No.: US 10,679,252 B2
(45) Date of Patent: Jun. 9, 2020

(54) INFORMATION PROCESSING METHOD AND INFORMATION PROCESSING APPARATUS

(71) Applicants: BEIJING KUANGSHI TECHNOLOGY CO., LTD., Beijing (CN); PINHOLE (BEIJING) TECHNOLOGY CO., LTD., Beijing (CN)

(72) Inventors: Yuning Jiang, Beijing (CN); Qi Yin, Beijing (CN)

(73) Assignees: BEIJING KUANGSHI TECHNOLOGY CO., LTD., Beijing (CN); PINHOLE (BEIJING) TECHNOLOGY CO., LTD., Beijing (CN)

( * ) Notice: Subject to any disclaimer, the term of this patent is extended or adjusted under 35 U.S.C. 154(b) by 480 days.

(21) Appl. No.: 14/992,507

(22) Filed: Jan. 11, 2016

(65) Prior Publication Data

US 2017/0061494 A1  Mar. 2, 2017

(30) Foreign Application Priority Data

Aug. 24, 2015 (CN) .......................... 2015 1 0524724

(51) Int. Cl.
*G06Q 30/00* (2012.01)
*G06Q 30/02* (2012.01)
(Continued)

(52) U.S. Cl.
CPC ..... *G06Q 30/0263* (2013.01); *G06F 16/5838* (2019.01); *G06F 16/9535* (2019.01); *G06K 9/00228* (2013.01)

(58) Field of Classification Search
None
See application file for complete search history.

(56) References Cited

U.S. PATENT DOCUMENTS

2007/0226624 A1* 9/2007 Peker ................. G06K 9/00751
715/719
2009/0125544 A1 5/2009 Brindley
(Continued)

FOREIGN PATENT DOCUMENTS

CN 102012937 4/2011
CN 102662950 9/2012
(Continued)

OTHER PUBLICATIONS

Pinterest Vintage Super Hero cartoon, 1950.*
(Continued)

*Primary Examiner* — Alvin L Brown
(74) *Attorney, Agent, or Firm* — Hamre, Schumann, Mueller & Larson, P.C.

(57) ABSTRACT

An information processing method comprises: acquiring an original webpage; parsing the original webpage to determine a set of candidate images; detecting whether at least one candidate image in the set of candidate images contains a face; determining a target face from at least one detected face, and determining a candidate image corresponding to the target face as a target image; analyzing the target face to obtain at least one content feature of the original webpage, wherein the at least one content feature includes at least one of a face attribute feature and a personal identity feature; determining display contents matching the at least one content feature based on the at least one content feature; inserting the display contents into a target area corresponding to the target image in the original webpage in a form of a dialog box to acquire a target webpage; and outputting the target webpage.

12 Claims, 5 Drawing Sheets

(51) Int. Cl.
*G06K 9/00* (2006.01)
*G06F 16/583* (2019.01)
*G06F 16/9535* (2019.01)

(56) References Cited

U.S. PATENT DOCUMENTS

| | | | | |
|---|---|---|---|---|
| 2009/0245617 | A1* | 10/2009 | Bhatti | G06Q 30/02 |
| | | | | 382/141 |
| 2009/0317019 | A1* | 12/2009 | Puliur | G06Q 30/02 |
| | | | | 382/294 |
| 2010/0014721 | A1* | 1/2010 | Steinberg | G06F 17/30247 |
| | | | | 382/118 |
| 2014/0195345 | A1* | 7/2014 | Lyren | G06Q 30/0271 |
| | | | | 705/14.53 |
| 2015/0186341 | A1 | 7/2015 | Redol et al. | |
| 2015/0227813 | A1* | 8/2015 | Vanhoucke | G06Q 30/02 |
| | | | | 382/100 |
| 2017/0249514 | A1* | 8/2017 | Folkens | G06K 9/00684 |

FOREIGN PATENT DOCUMENTS

| | | |
|---|---|---|
| CN | 104598869 | 5/2015 |
| CN | 104837060 | 8/2015 |

OTHER PUBLICATIONS

First Office Action, issued in the corresponding Chinese patent application No. 201510524724.0, dated Mar. 5, 2018, 14 pages.
Second Office Action, issued in the corresponding Chinese patent application No. 201510524724.0, dated Dec. 18, 2018, 17 pages.

* cited by examiner

INFORMATION PROCESSING METHOD AND INFORMATION PROCESSING APPARATUS

CROSS-REFERENCE TO RELATED APPLICATION

The present disclosure claims the benefits of and priority of Chinese patent application No. 201510524724.0 filed on Aug. 24, 2015, the disclosure of which is incorporated herein by reference in its entirety.

TECHNICAL FIELD

The present disclosure relates to the field of information processing, and more particularly, to an information processing method and an information processing apparatus.

BACKGROUND

With the development of Internet technology, a technique of inserting additional information into a webpage being browsed by a user emerges. In this technique, it is desired that the information to be inserted is information that the user is interested in, and displaying of the inserted information is notable but without affecting the user's normal browsing experience.

Take Internet advertising as an example, in the conventional method of launching advertisements exhibited in the internet, the user's points of interest are determined by analyzing past behaviors such as browsing records of the user, advertisements matching the user's points of interest are inserted into a webpage being currently browsed by the user. However, in such an advertisement launching method, first, the user's current points of interest are analyzed based on the user's past behaviors, since the user's points of interest are subject to change at any time, such a way of digging points of interest may probably have a deviation, resulting in a decrease of launching accuracy. Second, advertisements are inserted either in a notable area in a body part of the webpage or in a non-notable area in the webpage. In the former case, the user's browsing experience could be affected seriously, user experience is reduced; in the latter case, the user often overlooks the advertisements, resulting in poor launching effect. Moreover, in either case, displaying of the advertisements does not adapt to displaying of the webpage being browsed, it is obtrusive and unsightly, thereby user experience is also reduced.

SUMMARY

In view of the above situation, the present disclosure provides an information processing method and an information processing apparatus, which are capable of inserting information matching contents of the current webpage in a manner of being notable but without affecting a user's browsing experience.

According to an embodiment of the present disclosure, there is provided an information processing method, comprising steps of: acquiring an original webpage; parsing the original webpage to determine a set of candidate images; detecting whether at least one candidate image in the set of candidate images contains a face; determining a target face from at least one detected face, and determining a candidate image corresponding to the target face as a target image; analyzing the target face to obtain at least one content feature of the original webpage, wherein the at least one content feature includes at least one of a face attribute feature and a personal identity feature; determining display contents matching the at least one content feature based on the at least one content feature; inserting the display contents into a target area corresponding to the target image in the original webpage in a form of a dialog box to acquire a target webpage; and outputting the target webpage.

According to another embodiment of the present disclosure, there is provided an information processing apparatus, comprising: an acquiring unit for acquiring an original webpage; a parsing unit for parsing the original webpage to determine a set of candidate images; a detecting unit for detecting whether at least one candidate image in the set of candidate images contains a face; a target determining unit for determining a target face from at least one detected face, and determining a candidate image corresponding to the target face as a target image; an analyzing unit for analyzing the target face to obtain at least one content feature of the original webpage, wherein the at least one content feature includes at least one of a face attribute feature and a personal identity feature; a content determining unit for determining display contents matching the at least one content feature based on the at least one content feature; an inserting unit for inserting the display contents into a target area corresponding to the target image in the original webpage in a form of a dialog box to acquire a target webpage; and an outputting unit for outputting the target webpage.

According to another embodiment of the present disclosure, there is provided an information processing apparatus, comprising: a processor, a memory; and computer program instructions stored in the memory and configured to, when run by the processor, cause the information processing apparatus to execute steps of: acquiring an original webpage; parsing the original webpage to determine a set of candidate images; detecting whether at least one candidate image in the set of candidate images contains a face; determining a target face from at least one detected face, and determining a candidate image corresponding to the target face as a target image; analyzing the target face to obtain at least one content feature of the original webpage, wherein the at least one content feature includes at least one of a face attribute feature and a personal identity feature; determining display contents matching the at least one content feature based on the at least one content feature; inserting the display contents into a target area corresponding to the target image in the original webpage in a form of a dialog box to acquire a target webpage; and outputting the target webpage.

According to another embodiment of the present disclosure, there is provided a computer program product comprising a computer readable storage medium on which computer program instructions are stored. The computer program instructions is capable of, when being run by a computer, causing the computer to perform the steps of: acquiring an original webpage; parsing the original webpage to determine a set of candidate images; detecting whether at least one candidate image in the set of candidate images contains a face; determining a target face from at least one detected face, and determining a candidate image corresponding to the target face as a target image; analyzing the target face to obtain at least one content feature of the original webpage, wherein the at least one content feature includes at least one of a face attribute feature and a personal identity feature; determining display contents matching the at least one content feature based on the at least one content feature; inserting the display contents into a target area corresponding to the target image in the original webpage in a form of a dialog box to acquire a target webpage; and outputting the target webpage.

In the information processing method and the information processing apparatus in the embodiments of the present disclosure, faces in the webpage are detected to thereby acquire content features of the webpage, display contents matching the content features are inserted into a target area in the webpage, so as to be capable of inserting information matching content features of the current webpage in a manner of being notable but without affecting a user's browsing experience.

DETAILED DESCRIPTION OF THE EMBODIMENTS

Hereinafter, the embodiments of the present disclosure will be described in detail with reference to the accompanying drawings.

First, an information processing method according to an embodiment of the present disclosure will be described with reference to FIG. 1.

Figure 1:
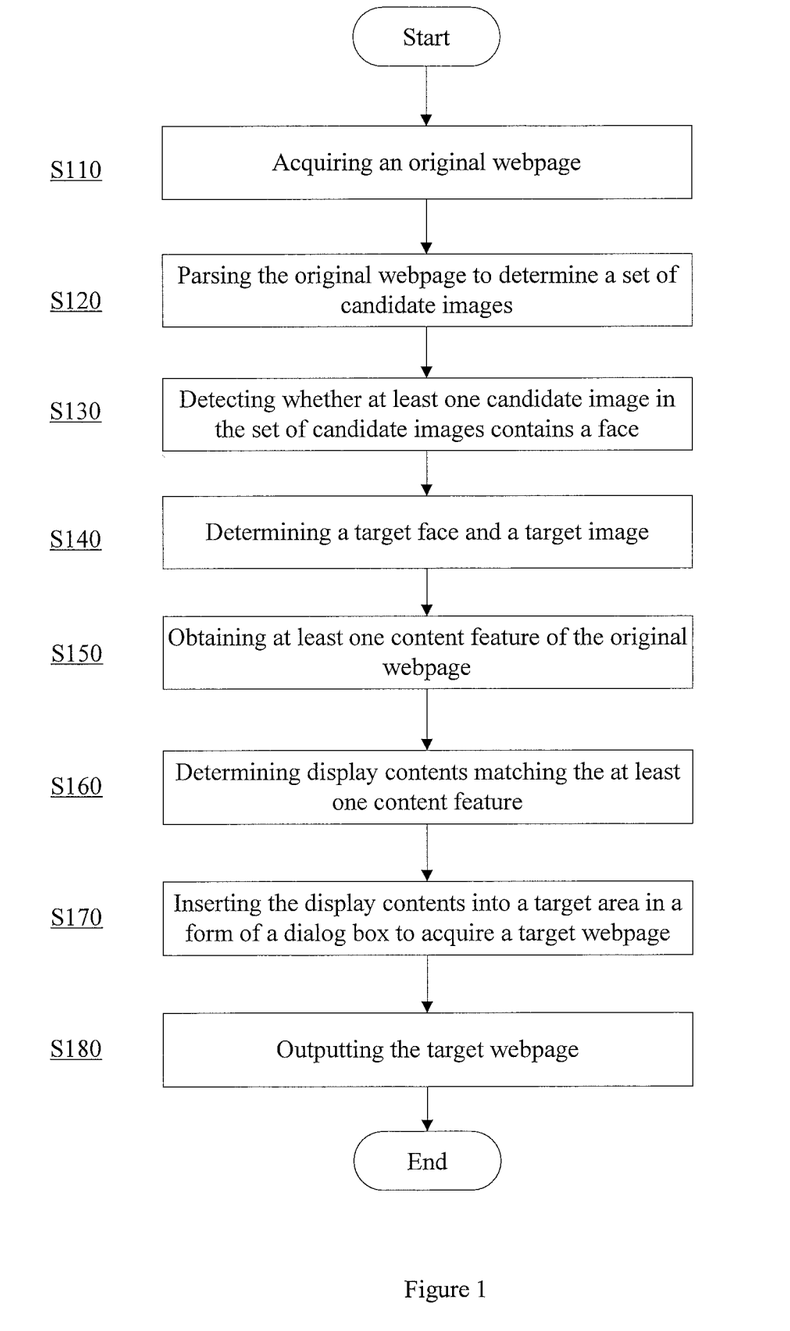
FIG. 1 is a flowchart illustrating an information processing method according to an embodiment of the present disclosure.

As shown in FIG. 1, first, in step S110, an original webpage is acquired.

Specifically, when a user accesses a webpage, the address of the webpage (for the sake of distinction, referred to as the original webpage when appropriate) is acquired according to an access request from the user.

Next, in step S120, the original webpage is parsed to determine a set of candidate images.

Specifically, codes of the original webpage may be parsed to acquire image information of each image in the original webpage. The image information represents an attribute of an image, it may for example include, but not limited to, at least one of image size, image position, image notability, and any combination thereof.

Thereafter, the set of candidate images may be determined from all images in the original webpage based on the image information.

Specifically, for example, a selection criterion with respect to the set of candidate images may be determined. In a first example, the selection criterion may be that an image size is larger than a predetermined size threshold. In a second example, the selection criterion may be that an image position is located within a predetermined range. In a third example, the selection criterion may be that an image notability is larger than a predetermined notability threshold. The aforesaid predetermined size threshold, predetermined range, and predetermined notability threshold may be appropriately set by a person skilled in the art as needed, here no specific definitions are made thereto. In addition, the above described selection criteria are merely exemplary. A person skilled in the art may set other types of selection criteria according to the image information.

Accordingly, it may be determined whether image information of each image satisfies the selection criterion, and one or more images that satisfy the selection criterion may be determined as the set of candidate images.

Next, in step S130, it is detected whether each candidate image contains a face. A person skilled in the art can employ various face recognition methods, such as an approach based on Support Vector Machine, an approach based on Deep Learning, to perform the detection, no more details are repeated here.

Thereafter, in step S140, a target face is determined from at least one detected face, e.g. from multiple detected faces as detected in step S130, and a candidate image corresponding to the target face is determined as a target image.

Specifically, for example, a selection criterion with respect to the target face may be determined. In a first example, a face whose face size is larger than a predetermined size threshold among the detected faces is determined as the target face. In a second example, a face whose face definition is larger than a predetermined definition threshold among the detected faces is determined as the target face. In a third example, a face whose facial pose satisfies a predetermined facial pose among the detected faces is determined as the target face. The aforesaid predetermined size threshold, predetermined definition threshold, and predetermined facial pose may be appropriately set by a person skilled in the art as needed, here no specific limitations are made thereto. In addition, the above described selection criteria are merely exemplary. A person skilled in the art may set other types of selection criteria for the target face.

After one or more target faces are determined among the detected faces, the candidate image corresponding to the target face is determined as the target image.

Next, in step S150, the target face is analyzed to obtain at least one content feature of the original webpage.

The at least one content feature includes at least one of a face attribute feature and a personal identity feature. Specifically, on the one hand, the target face may be analyzed through an analysis method such as a machine learning method, etc., to obtain the face attribute feature. The face attribute feature includes at least one of age, sex, race, label, skin smoothness, beauty index, or any combination thereof. Of course, the aforesaid face attribute feature is merely exemplary. A person skilled in the art may analyze and extract other face attribute features from the target face.

On the other hand, the target face may be analyzed through an analysis method such as a machine learning method, etc., to obtain the personal identity feature. The personal identity feature includes at least one of celebrity and occupation, or any combination thereof. Of course, the personal identity feature is merely exemplary. A person skilled in the art may analyze and extract other personal identity features from the target face.

It needs to be noted that the above described face attribute feature and personal identity feature are merely exemplary. A person skilled in the art may analyze and extract other features associated with face from the target face as needed as the at least one content feature of the original webpage.

After acquiring the at least one content feature of the original webpage, the information processing method proceeds to step S160 in which display contents matching the at least one content feature are determined based on the at least one content feature.

Specifically, first, points of interest of a user that intends to browse the original webpage may be determined based on the at least one content feature. More specifically, points of interest of the user may be dug based on the at least one content feature by employing a machine learning method and so on, specific processing thereof is known for a person skilled in the art, and no more details are repeated herein.

Next, display contents matching the points of interest may be determined from a content library. In other words, display contents in various aspects may be stored in advance in the content library, thereby display contents matching the points of interest can be determined therefrom.

Take launching of exhibited advertisements as an example, the content library is for example an advertisement library pertaining to an apparatus (e.g., a server) to which the information processing method is applied or a third-party advertisement trading platform, which stores for example advertising materials such as food, sports, travel and other aspects. After the user's current points of interest are determined based on the webpage that the user desires to browse currently through the processing in steps S110 to S150 described above, corresponding advertising materials are determined from the advertisement library or the third party advertisement trading platform, so that the advertisements are to be launched with pertinence.

Thereafter, in step S170, the display contents are inserted into a target area corresponding to the target image in the original webpage in a form of a dialog box to acquire a target webpage.

Specifically, the target area may be an area that is most suitable for inserting the display contents (such as, advertisements) among the areas where the target image locates.

Illustratively, the target area is associated with the target face. More specifically, first, at least one position of critical points of the target face may be detected. The critical points are for example face critical points such as critical points of lips. A person skilled in the art may detect multiple positions of the critical points of the target face by employing the existing and future-developed various methods for critical point detection, and no more details are repeated herein. Next, the target area may be determined based on the positions of the critical points. For example, the area adjacent to the position of lips of the target face can be determined as the target area. Thereafter, the display contents are inserted into the target area in the form of the dialog box.

It should be noted that the method for determining the target area described above is merely exemplary. A person skilled in the art may determine other areas in the target image as the target area. For example, it may simply set a specific position (e.g., a middle area, or a certain corner) in the area where the target image locates as the target area. As another example, the target area may be set as an area corresponding to a large piece of image elements whose hue is relatively singular in the target image. Specifically, it is possible to perform image segmentation processing or salient region detection processing on the target image so as to determine the area that is most suitable for inserting the display contents as the target area.

In addition, in this step (step S170), a display attribute of the display contents may be adjusted according to properties of the target area, and the adjusted display contents may be inserted into the target area. Specifically, the properties of the target area for example include, but not limited to, at least one of size, shape, color, object attribute and so on of the target area, or any combination thereof. The display attribute of the display contents for example includes, but not limited to, at least one of color, contrast, size, shape and so on of the display contents, or any combination thereof. Therefore, more coordination can be enabled between the display contents and the target image.

In addition, in this step (step S170), a shape of the dialogue box can be determined according to the target face. Specifically, first, critical points (such as critical points of the lips) on the target face may be detected through the manner described above. Thereafter, the shape of an outer frame of the dialog box may be determined based on the positions of the critical points. In particular, the shape of the outer frame of the dialog box may be determined based on relative position relationship between the critical points on the target face (e.g., critical points of the lips) and the determined target area. For example, a portion of the dialogue box for pointing to a speaker may be made to face the location of a critical point on the target face (e.g., the location of the lips on the target face.)

In step S180, the target webpage is outputted. In one example, the information processing method according to the embodiment of the present disclosure may be applied to for example a server. The server communicates with a user terminal like a mobile phone, a computer and so on. Thereby, the server sends the target webpage back to the user terminal, and the target webpage is displayed on the user terminal. Alternatively, in a case where processing capability of the user terminal is relatively strong, the information processing method may be also applied to the user terminal. Thus, in this step, the user terminal directly displays the target page.

Now, in conjunction with FIG. 2, assuming that the display contents are advertisements, an exemplary application scenario of the information processing method according to an embodiment of the present disclosure will be described.

Figure 2A:
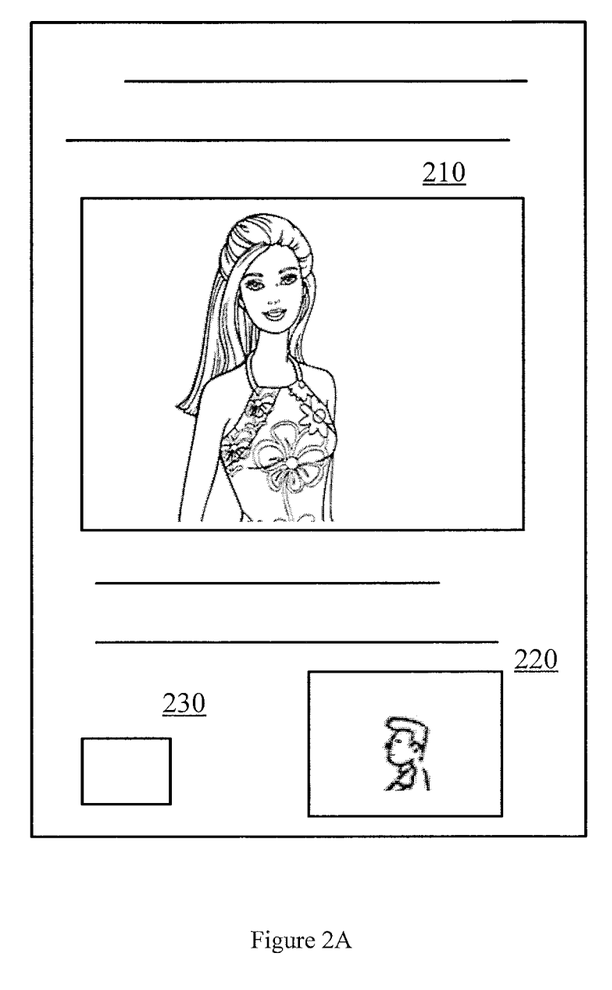
FIGS. 2A-2D are schematic diagrams illustrating scenarios where the information processing method according to an embodiment of the present disclosure is applied.

FIG. 2A illustrates an original webpage which would be displayed according to the user's access request, wherein three images are comprised: a first image 210, a second image 220, and a third image 230. It can be known by parsing codes of the original webpage that, image size of the first image 210 and that of the second image 220 are larger than a threshold, thereby the first image 210 and the second image 220 are determined as a set of candidate images.

Next, it is detected that both the first image 210 and the second image 220 contain a face, but the size of the face contained in the first image 210 is larger than a predetermined size threshold, while the size of the face contained in the second image 220 is smaller than the predetermined size threshold, therefore face contained in the first image 210 is determined as a target face, accordingly, the first image 210 is determined as the target image.

Figure 2B:
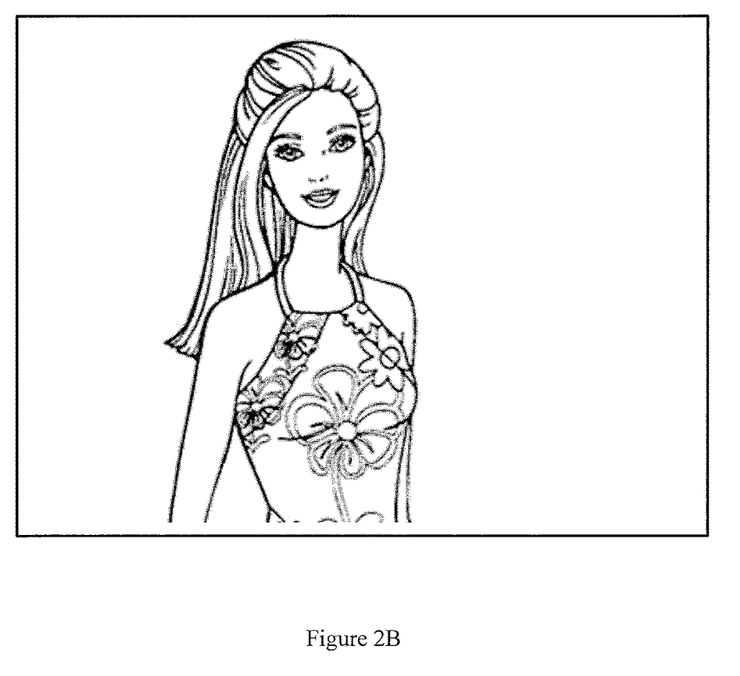
Figure 2C:
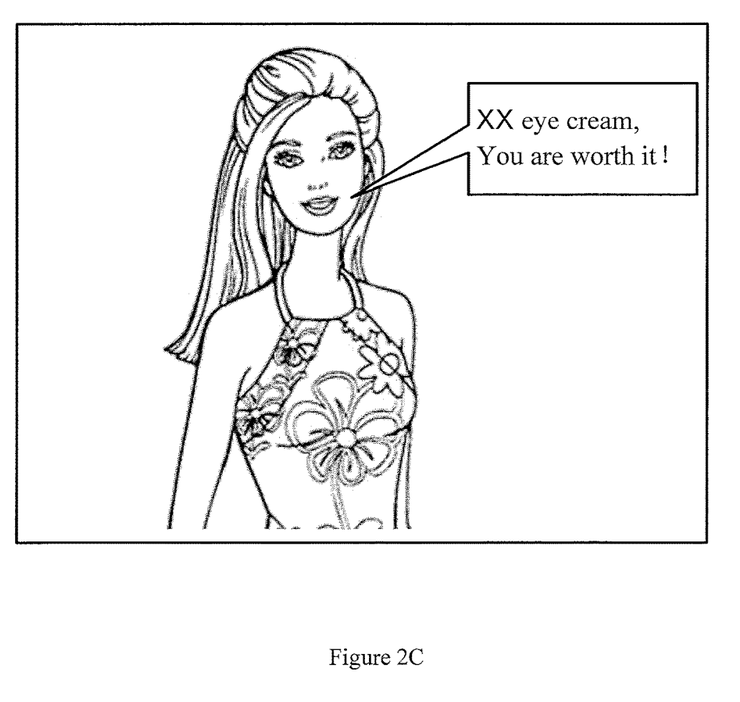
Figure 2D:
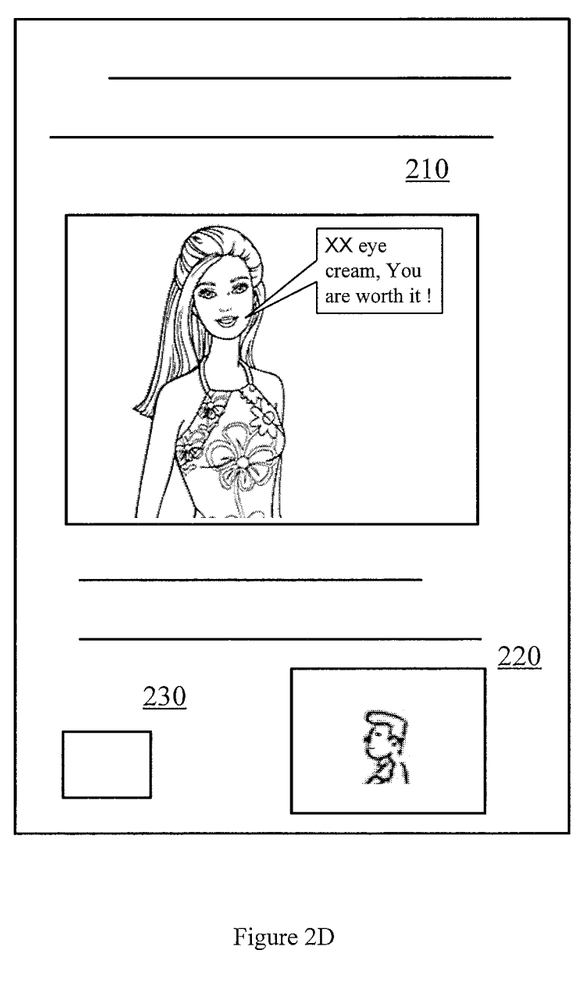

FIG. 2B illustrates an enlarged picture of the target image and the target face contained therein. By analyzing the target face, it is identified that the face attribute feature of the target face as a young female, the personal identity feature thereof is a certain celebrity, and the identified face attribute feature and personal identify feature are taken as the content features of the original webpage. It can be understood that other face attribute features (e.g., race, label, skin smoothness, beauty index, or any combination with age and/or sex) and personal identity feature (e.g., occupation and/or combination with celebrity) can be taken as the content features of the original webpage. Thereby, it can be determined that the user's points of interest are beauty based on the face attribute feature, accordingly, display contents matching the target face are determined, for example, as advertisements of eye cream, so that material images including advertising promotion languages are obtained. Alternatively, or in combination, it may be determined that user's points of interest are this celebrity based on the personal identify feature, thereby display contents matching the target face are determined, for example, advertisements with this celebrity as a spokesperson, so that material images including advertising promotion languages are obtained. Thereafter, by detecting the positions of the critical points of the target face, for example, lips of the target face, the positions adjacent to the lips is determined as the target area, and the shape of the outer frame of the dialogue box is determined based on the relative position relationship between the target area and the lips. Next, the display attribute of the display contents may be adjusted according to the properties of the target area. For example, it is possible to adjust the size of the material images according to the size of the target area, adjust the color of the material images according to the color of the target area, to make the color of the material images be adaptive to the color of the target area, and insert the adjusted advertising material images into the target area in the form of for example the dialogue box, as shown in FIG. 2C. Finally, the target page is outputted, and the target webpage shown in FIG. 2D is displayed on the user terminal.

The information processing method according to the embodiment of the present disclosure is described above with reference to FIGS. 1 and 2.

It should be noted that, although the information processing method according to the embodiment of the present disclosure is described above using advertisements as an example, the present disclosure is not limited thereto, instead, it may be applied to displaying of various display contents.

In the information processing method according to the embodiment of the present disclosure, a face in the webpage is analyzed to acquire content features of the webpage including at least one of the face attribute feature and the personal identify feature, and display contents matching the content features are inserted into the target area of the webpage, so that information matching contents of the current webpage can be inserted in a manner of being notable but without affecting user's browsing experience.

When the information processing method according to the embodiment of the present application is applied to launching of exhibited advertisements, advertisements associated with the image (esp. face image) in the current webpage can be launched. Specifically, points of interest that the user may currently have can be dug accurately based on the current webpage and associated advertisements can be recommended in real time.

In addition, in the information processing method according to the embodiment of the present application, advertisements may adopt an image-based advertisement exhibiting manner, that is, the advertisements may be inserted in an area where a specific image in the current webpage locates, thus, it is eye-catching but without interrupting user's experience for viewing the webpage. Furthermore, such exhibiting manner requires no additional advertising site, which is extremely advantageous in a case where screen size is limited (such as being applied to displaying of mobile phones).

In addition, in the information processing method according to the embodiment of the present application, the display area and display attribute of the advertising materials can be determined based on the properties of the target image, thus exhibiting of the advertisements is more eye-pleasing and more harmonious.

In addition, in the information processing method according to an embodiment of the present application, the content features of the webpage are acquired automatically through algorithms like a machine learning algorithm and so on to dig the user's points of interest, and the process requires no manual tagging, therefore, processing efficiency is improved, and processing time is shortened.

Hereinafter, an information processing apparatus according to an embodiment of the present disclosure is described with reference to FIG. 3.

Figure 3:
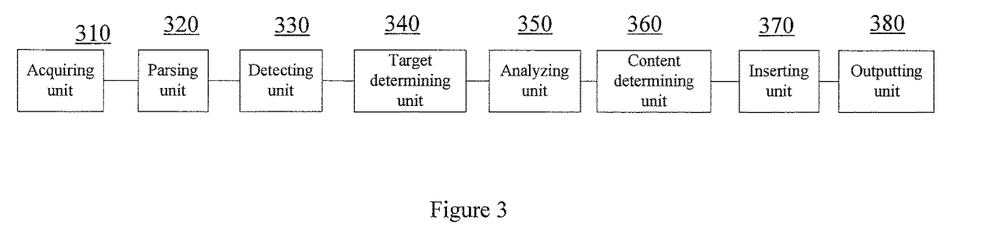
FIG. 3 is a block diagram illustrating main configuration of an information processing apparatus according to an embodiment of the present disclosure.

FIG. 3 is a block diagram illustrating main configuration of an information processing apparatus according to an embodiment of the present disclosure. As shown in FIG. 3, the information processing apparatus 300 according to the embodiment of the present disclosure comprises: an acquiring unit 310, a parsing unit 320, a detecting unit 330, a target determining unit 340, an analyzing unit 350, a content determining unit 360, an inserting unit 370, and an outputting unit 380.

Specifically, the acquiring unit 310 is for acquiring an original webpage. The parsing unit 320 is for parsing the original webpage to determine a set of candidate images. The detecting unit 330 is for detecting whether each candidate image in the set of candidate images contains a face. The target determining unit 340 is for determining a target face from at least one detected face, e.g., from multiple detected faces, and determining a candidate image corresponding to the target face as a target image. The analyzing unit 350 is for analyzing the target face, to obtain at least one content feature of the original webpage, the at least one content feature includes at least one of a face attribute feature and a personal identity feature. The content determining unit 360 is for determining display contents matching the at least one content feature based on the at least one content feature. The inserting unit 370 is for inserting the display contents into a target area corresponding to the target image in the original webpage in a form of a dialog box to acquire a target webpage. The outputting unit 380 is for outputting the target webpage.

In an embodiment, the parsing unit 320 comprises: an image information acquiring unit for parsing codes of the original webpage to acquire image information of each image in the original webpage, wherein the image information includes at least one of image size, image position, and image notability, and a candidate image determining unit for determining the set of candidate images from all images in the original webpage based on the image information.

In another embodiment, the target determining unit 340 is configured to execute at least one of: determining a face whose face size is larger than a predetermined size threshold among the detected faces as the target face; determining a face whose face definition is larger than a predetermined definition threshold among the detected faces as the target face; and determining a face whose facial pose satisfies a predetermined facial pose among the detected faces as the target face.

In another embodiment, the analyzing unit 350 is configured for: analyzing the target face through a machine learning method to obtain at least one of the face attribute feature and the personal identity feature. The face attribute feature includes at least one of age, sex, race, label, skin smoothness, and beauty index; and the personal identity feature includes at least one of celebrity and occupation.

In another embodiment, the content determining unit 360 comprises: a point of interest determining unit for determining points of interest of a user that intends to browse the original webpage based on the content features; and a matching content determining unit for determining display contents matching the points of interest from a content library.

In another embodiment, the inserting unit 370 comprises: an attribute adjusting unit for adjusting a display attribute of the display contents according to properties of the target area; and a content inserting unit for inserting the adjusted display contents into the target area.

In another embodiment, the inserting unit 370 comprises: a critical point determining unit for detecting positions of critical points of the target face; an area and shape determining unit for determining at least one of a shape of an outer frame of the dialog box and a shape of the target area based on the at least one position of the critical points; and a content inserting unit for inserting the display contents into the target area in the form of the dialog box.

Functions and configurations of respective units of the information processing apparatus 300 have already been described in detail in the information processing method described with reference to FIG. 1, therefore no more details repeated here.

Figure 4:
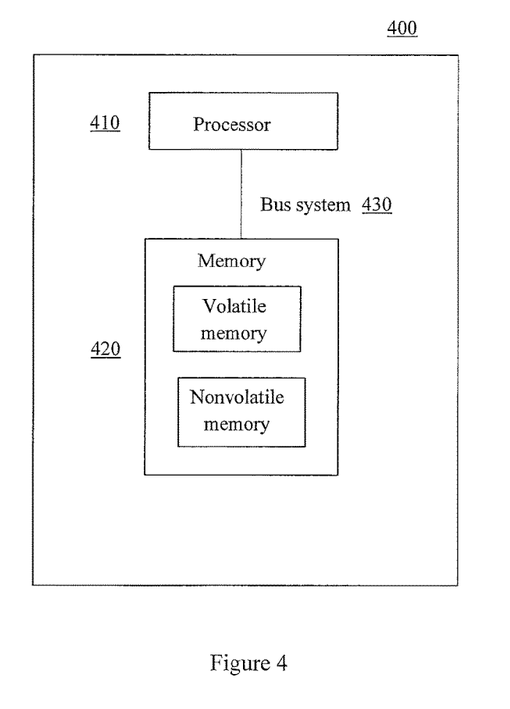
FIG. 4 is a block diagram illustrating main configuration of an information processing apparatus according to another embodiment of the present disclosure.

FIG. 4 is a block diagram illustrating main configuration of an information processing apparatus according to another embodiment of the present disclosure.

As shown in FIG. 4, the information processing apparatus 400 according to the embodiment of the present disclosure mainly comprises: one or more processors 410; and a memory 420. These components may be interconnected by a bus system 430 and/or other forms of connection mechanism (not shown). It should be noted that components and structures of the information processing apparatus 400 shown in FIG. 4 are merely exemplary, rather than restrictive, the information processing apparatus 400 may have other components and structures as needed.

The processor 410 may be a central processing unit (CPU) or a processing unit in other forms with data processing capability and/or instruction executing capability, and can control the other components in the information processing apparatus 400 to perform desired functions.

The memory 420 may include one or more forms of computer-readable storage medium, e.g., a volatile memory and/or nonvolatile memory. The volatile memory may include, for example, RAM and/or cache and so on. The nonvolatile memory may for example include ROM, hard disk, flash memory and so on. One or more computer program instructions may be stored on the computer-readable storage medium, the processor 420 may run the program instructions to implement the functions of the information processing method according to the embodiment of the present disclosure, and/or desired functions of the information processing apparatus.

In particular, the computer program instructions, when run by the processor 410, cause the information processing apparatus 400 to execute the steps of: acquiring an original webpage; parsing the original webpage to determine a set of candidate images; detecting whether at least one candidate image in the set of candidate images contains a face; determining a target face from at least one detected face, and determining a candidate image corresponding to the target face as a target image; analyzing the target face to obtain at least one content feature of the original webpage, wherein the at least one content feature comprises at least one of a face attribute feature and a personal identity feature; determining display contents matching the at least one content feature based on the at least one content feature; inserting the display contents into a target area corresponding to the target image in the original webpage in a form of a dialog box to acquire a target webpage; and outputting the target webpage.

Further, the step of parsing the original webpage, executed by the information processing apparatus 400 caused by the computer programs instructions run by the processor 410, comprises: parsing codes of the original webpage to acquire image information of each image in the original webpage, wherein the image information comprises at least one of image size, image position, and image notability, and determining the candidate image from all images in the original webpage based on the image information.

Further, the step of determining a target face from at least one detected faces, executed by the information processing apparatus 400 caused by the computer programs instructions run by the processor 410, comprises at least one of: determining a face whose face size is larger than a predetermined size threshold among the at least one detected face as the target face; determining a face whose face definition is larger than a predetermined definition threshold among the at least one detected face as the target face; and determining a face whose facial pose satisfies a predetermined facial pose among the at least one detected face as the target face.

Further, the step of analyzing the target face, executed by the information processing apparatus 400 caused by the computer programs instructions run by the processor 410, comprises: analyzing the target face through a machine learning method to obtain at least one of the face attribute feature and the personal identity feature, wherein the face attribute feature comprises at least one of age, sex, race, label, skin smoothness, and beauty index and wherein the personal identity feature comprises at least one of celebrity and occupation.

Further, the step of determining display contents matching the at least one content feature, executed by the information processing apparatus 400 caused by the computer programs instructions run by the processor 410, comprises: determining points of interest of a user that intends to browse the original webpage based on the at least one content feature; and determining display contents matching the points of interest from a content library.

Further, the step of inserting the display contents into a target area corresponding to the target image in the original webpage in a form of a dialog box to acquire a target webpage, executed by the information processing apparatus 400 caused by the computer programs instructions run by the processor 410, comprises: adjusting a display attribute of the display contents according to properties of the target area; and inserting the adjusted display contents into the target area.

Further, the step of inserting the display contents into a target area corresponding to the target image in the original webpage in a form of a dialog box to acquire a target webpage, executed by the information processing apparatus 400 caused by the computer programs instructions run by the processor 410, comprises: detecting at least one position of critical points of the target face; determining at least one of a shape of an outer frame of the dialog box and a shape of the target area based on the at least one position of the critical points; and inserting the display contents into the target area in the form of the dialog box.

The information processing apparatus according to the embodiment of the present disclosure is described above with reference to FIGS. 3 and 4.

In the information processing apparatus according to the embodiment of the present disclosure, a face in the webpage is analyzed to acquire content features of the webpage including at least one of the face attribute feature and the personal identify feature, and display contents matching the content features are inserted into the target area of the webpage, so that information matching contents of the current webpage can be inserted in a manner of being notable but without affecting user's browsing experience.

When the information processing apparatus according to the embodiment of the present application is applied to launching of exhibited advertisements, advertisements associated with the image (esp. face image) in the current webpage can be launched. Specifically, points of interest that the user may currently have can be dug accurately based on the current webpage and associated advertisements can be recommended in real time.

In addition, in the information processing apparatus according to the embodiment of the present application, advertisements may adopt an image-based advertisement exhibiting manner, that is, the advertisements may be inserted in an area where a specific image in the current webpage locates, thus, it is eye-catching but without interrupting user's experience for viewing the webpage. Furthermore, such exhibiting manner requires no additional advertising site, which is extremely advantageous in a case where screen size is limited (such as being applied to displaying of mobile phones).

In addition, in the information processing apparatus according to the embodiment of the present application, the display area and display attribute of the advertising materials can be determined based on the properties of the target image, thus exhibiting of the advertisements is more eye-pleasing and more harmonious.

In addition, in the information processing apparatus according to the embodiment of the present application, the content features of the webpage are acquired automatically through algorithms like a machine learning algorithm and so on to dig the user's points of interest, and the process requires no manual tagging, therefore, processing efficiency is improved, and processing time is shortened.

In addition, according to another embodiment of the present disclosure, there is provided a computer program product, comprising a computer readable storage medium on which computer program instructions are stored. The computer program instructions being capable of, when being run by a computer, causing the computer to perform the steps of: acquiring an original webpage; parsing the original webpage to determine a set of candidate images; detecting whether at least one candidate image in the set of candidate images contains a face; determining a target face from at least one detected face, and determining a candidate image corresponding to the target face as a target image; analyzing the target face to obtain at least one content feature of the original webpage, wherein the at least one content feature includes at least one of a face attribute feature and a personal identity feature; determining display contents matching the at least one content feature based on the at least one content feature; inserting the display contents into a target area corresponding to the target image in the original webpage in a form of a dialog box to acquire a target webpage; and outputting the target webpage.

It should be noted that, in this specification, the terms "comprise", "include" and any other variations thereof intend to cover nonexclusive inclusion so that the procedure, the method, the product or the equipment including a series of elements include not only these elements, but also other elements which are not listed explicitly, or also include inherent elements of these procedure, method, product or equipment. In the case that there is no further limitation, elements defined by the expressions "comprise one . . . " do not exclude there being additional identical elements in the procedure, method, product or equipment of the elements.

Further, it needs to be noted that, in this specification, expressions such as "first . . . unit", "second . . . unit" are merely for convenience to distinguish, do not mean that they must be implemented as two or more units physically separated. In fact, the units may be implemented as a single unit integrally, or as a plurality of units as needed.

Finally, it should be noted that, the above-described series of processings do not only comprise processings executed chronologically in the order mentioned here, and also comprise processings executed in parallel or individually but not chronologically.

Through the above description of the implementations, a person skilled in the art can clearly understand that the present disclosure may be implemented in a manner of software plus a necessary hardware platform, and of course the present disclosure may also be implemented fully by hardware. Based on such understanding, the technical solutions of the present disclosure that contribute to the background art may be embodied in whole or in part in the form of a software product. The computer software product may be stored in a storage medium, such as ROM/RAM, disk, CD-ROM, and include several instructions for causing a computer apparatus (which may be a personal computer, a server, or a network device and so on) to perform the method described in the various embodiments of the present disclosure or certain parts thereof.

In the disclosed embodiments, a unit/module may be implemented with software for execution by various processors. For example, an identified module of executable codes may include one or more physical or logical blocks of computer instructions, for example, it may be constructed as an object, a procedure, or a function. Nevertheless, executable codes of the identified module do not need to be physically located together, they may comprise different instructions stored in different locations, when these instructions are logically combined, and they can constitute the unit/module and achieve purposes specified for the unit/module.

When the unit/module may be implemented with software, taking into account the level of existing hardware technology, as for the unit/module that may be implemented with software, regardless of the cost, a person skilled in the art may always build a corresponding hardware circuit to achieve corresponding functions, the hardware circuit comprises conventional very large scale integrated (VLSI) circuits or gate arrays, and conventional semiconductors such chips, transistors or the like, or other discrete components. The module may also be implemented with programmable hardware devices, such as field programmable gate arrays, programmable array logics, programmable logic devices, and so on.

Although the present disclosure has been described in detail in the above, specific examples are applied in this text to demonstrate the principles and implementations of the present disclosure, these descriptions of the above embodiments are only to help understand the method of the present disclosure and its core concept. Meanwhile, for a person with ordinary skill in the art, depending on the concepts of the present disclosure, modifications may be made to the specific implementations and applications. To sum up, contents of this specification should not be construed as limiting the present disclosure.

What is claimed is:

1. An information processing method, comprising steps of:

acquiring, by an acquiring unit, an original webpage;

parsing, by a parsing unit, the original webpage to determine a set of candidate images;
detecting, by a detecting unit, whether at least one candidate image in the set of candidate images contains a face;
determining, by a target determining unit, a target face from at least one detected face, and determining a candidate image corresponding to the target face as a target image;
analyzing, by an analyzing unit, the target face to obtain at least one content feature of the original webpage, wherein the content feature comprises at least one of a face attribute feature and a personal identity feature;
determining, by a content determining unit, display contents matching the at least one content feature based on the at least one content feature;
inserting, by an inserting unit, the display contents into a target area corresponding to the target image in the original webpage in a form of a dialog box to acquire a target webpage; and
outputting, by an outputting unit, the target webpage,
wherein the step of inserting, by the inserting unit, the display contents into a target area corresponding to the target image in the original webpage in a form of a dialog box to acquire a target webpage comprises:
detecting, by a critical point determining unit of the inserting unit, at least one position of critical points of the target face;
determining, by an area and shape determining unit of the inserting unit, at least one of a shape of an outer frame of the dialog box and a shape of the target area based on the at least one position of the critical points; and
inserting, by a content inserting unit of the inserting unit, the display contents into the target area in the form of the dialog box,
wherein the step of inserting, by the inserting unit, the display contents into a target area corresponding to the target image in the original webpage in a form of a dialog box to acquire a target webpage further comprises:
adjusting, by an attribute adjusting unit of the inserting unit, a display attribute of the display contents according to properties of the target area; and
inserting, by the content inserting unit of the inserting unit, the adjusted display contents into the target area,
wherein the properties of the target area include at least one of size, shape, color, object attribute and so on of the target area, or any combination thereof, the display attribute of the display contents includes at least one of color, contrast, size, shape and so on of the display contents, or any combination thereof, so that more coordination can be enabled between the display contents and the target image, and
wherein the step of determining, by the target determining unit, a target face from at least one detected face comprises at least one of the step of:
determining, by the target determining unit, a face whose face size is larger than a predetermined size threshold among the at least one detected face as the target face as the target face;
determining, by the target determining unit, a face whose face definition is larger than a predetermined definition threshold among the at least one detected face as the target face as the target face; and
determining, by the target determining unit, a face whose facial pose satisfies a predetermined facial pose among the at least one detected face as the target face.

2. The information processing method according to claim 1,
wherein the step of parsing, by the parsing unit, the original webpage comprises:
parsing, by an image information acquiring unit of the parsing unit, codes of the original webpage to acquire image information of each image in the original webpage, wherein the image information comprises at least one of image size, image position, and image notability; and
determining, by a candidate image determining unit of the parsing unit, the set of candidate images from all images in the original webpage based on the image information.

3. The information processing method according to claim 1,
wherein the step of analyzing, by the analyzing unit, the target face comprises:
analyzing, by the analyzing unit, the target face through a machine learning method to obtain at least one of the face attribute feature and the personal identity feature,
wherein the face attribute feature comprises at least one of age, sex, race, label, skin smoothness, and beauty index, and
wherein the personal identity feature comprises at least one of celebrity and occupation.

4. The information processing method according to claim 1,
wherein the step of determining, by the content determining unit, display contents matching the at least one content feature comprises:
determining, by a point of interest determining unit of the content determining unit, points of interest of a user that intends to browse the original webpage based on the at least one content feature; and
determining, by a matching content determining unit of the content determining unit, display contents matching the points of interest from a content library.

5. An information processing apparatus, comprising:
an acquiring unit for acquiring an original webpage;
a parsing unit for parsing the original webpage to determine a set of candidate images;
a detecting unit for detecting whether at least one candidate image in the set of candidate images contains a face;
a target determining unit for determining a target face from at least one detected face, and determining a candidate image corresponding to the target face as a target image;
an analyzing unit for analyzing the target face to obtain at least one content feature of the original webpage, wherein the content feature comprises at least one of a face attribute feature and a personal identity feature;
a content determining unit for determining display contents matching the at least one content feature based on the at least one content feature;
an inserting unit for inserting the display contents into a target area corresponding to the target image in the original webpage in a form of a dialog box to acquire a target webpage; and
an outputting unit for outputting the target webpage,
wherein the inserting unit comprises:
a critical point determining unit for detecting at least one position of critical points of the target face;
an area and shape determining unit for determining at least one of a shape of an outer frame of the dialog box and a shape of the target area based on the at least one position of the critical points;

a content inserting unit for inserting the display contents into the target area in the form of the dialog box; and an attribute adjusting unit for adjusting a display attribute of the display contents according to properties of the target area;

wherein the content inserting unit for inserting inserts the adjusted display contents into the target area, wherein the properties of the target area include at least one of size, shape, color, object attribute and so on of the target area, or any combination thereof, the display attribute of the display contents includes at least one of color, contrast, size, shape and so on of the display contents, or any combination thereof, so that more coordination can be enabled between the display contents and the target image, and wherein the target determining unit is configured to execute at least one of the step of:

determining a face whose face size is larger than a predetermined size threshold among the at least one detected face as the target face;

determining a face whose face definition is larger than a predetermined definition threshold among the at least one detected face as the target face; and determining a face whose facial pose satisfies a predetermined facial pose among the at least one detected face as the target face.

6. The information processing apparatus according to claim 5, wherein the parsing unit comprises:

an image information acquiring unit for parsing codes of the original webpage to acquire image information of each image in the original webpage, wherein the image information comprises at least one of image size, image position, and image notability; and a candidate image determining unit for determining the candidate image from all images in the original webpage based on the image information.

7. The information processing apparatus according to claim 5, wherein the parsing analyzing unit is configured to:

analyze the target face through a machine learning method to obtain at least one of the face attribute feature and the personal identity feature, wherein the face attribute feature comprises at least one of age, sex, race, label, skin smoothness, and beauty index, and wherein the person identity feature comprises at least one of celebrity and occupation.

8. The information processing apparatus according to claim 5, wherein the content determining unit comprises:

a point of interest determining unit for determining points of interest of a user that intends to browse the original webpage based on the at least one content feature; and a matching content determining unit for determining display contents matching the points of interest from a content library.

9. An information processing apparatus, comprising:

a processor;

a memory; and computer program instructions stored in the memory and configured to when run by the processor, cause the information processing apparatus to execute steps of;

acquiring an original webpage;

parsing the original webpage to determine a set of candidate images;

detecting whether at least one candidate image in the set of candidate images contains a face;

determining a target face from at least one detected face, and determining a candidate image corresponding to the target face as a target image;

analyzing the target face to obtain at least one content feature of the original webpage, wherein the at least one content feature comprises at least one of a face attribute feature and a personal identity feature;

determining display contents matching the at least one content feature based on the at least one content feature;

inserting the display contents into a target area corresponding to the target image in the original webpage in a form of a dialog box to acquire a target webpage; and outputting the target webpage, wherein the step of inserting the display contents into a target area corresponding to the target image in the original webpage in a form of a dialog box to acquire a target webpage comprises:

detecting at least one position of critical points of the target face;

determining at least one of a shape of an outer frame of the dialog box and a shape of the target area based on the at least one position of the critical points; and inserting the display contents into the target area in the form of the dialog box, wherein the step of inserting the display contents into a target area corresponding to the target image in the original webpage in a form of a dialog box to acquire a target webpage, executed by the information processing apparatus caused by the computer programs instructions run by the processor, further comprises:

adjusting a display attribute of the display contents according to properties of the target area; and inserting the adjusted display contents into the target area, wherein the properties of the target area include at least one of size, shape, color, object attribute and so on of the target area, or any combination thereof, the display attribute of the display contents includes at least one of color, contrast, size, shape and so on of the display contents, or any combination thereof, so that more coordination can be enabled between the display contents and the target image, and wherein the step of determining a target face from at least one detected faces, executed by the information processing apparatus caused by the computer programs instructions run by the processor, comprises at least one of:

determining a face whose face size is larger than a predetermined size threshold among the at least one detected face as the target face;

determining a face whose face definition is larger than a predetermined definition threshold among the at least one detected face as the target face; and determining a face whose facial pose satisfies a predetermined facial pose among the at least one detected face as the target face.

10. The information processing apparatus according to claim 9, wherein the step of parsing the original webpage, executed by the information processing apparatus caused by the computer programs instructions run by the processor, comprises:

parsing codes of the original webpage to acquire image information of each image in the original webpage, wherein the image information comprises at least one of image size, image position, and image notability; and determining the candidate image from all images in the original webpage based on the image information.

11. The information processing apparatus according to claim 9, wherein the step of analyzing the target face, executed by the information processing apparatus caused by the computer programs instructions run by the processor, comprises:

analyzing the target face through a machine learning method to obtain at least one of the face attribute feature and the personal identity feature, wherein the face attribute feature comprises at least one of age, sex, race, label, skin smoothness, and beauty index and wherein the personal identity feature comprises at least one of celebrity and occupation.

12. The information processing apparatus according to claim 9, wherein the step of determining display contents matching the at least one content feature, executed by the information processing apparatus caused by the computer programs instructions run by the processor, comprises:

determining points of interest of a user that intends to browse the original webpage, based on the at least one content feature; and determining display contents matching the points of interest from a content library.

* * * * *